United States Patent Office 2,906,741
Patented Sept. 29, 1959

---

2,906,741
POLYMERIZABLE ORGANIC SULFIDES

Jesse C. H. Hwa, Levittown, Pa., assignor to Rohm & Haas Company, Philadelphia, Pa., a corporation of Delaware No Drawing. Application April 20, 1956
Serial No. 579,428

15 Claims. (Cl. 260—79.7)

This invention relates to polymerizable organic sulfides, polymers thereof, and to their preparation and use. This application is a continuation-in-part of my applications Serial No. 485,315, filed January 31, 1955, now abandoned, and Serial No. 571,877, filed March 16, 1956, now U.S. Patent 2,868,738, which in turn is a continuation-in-part of my application Serial No. 485,622, filed February 1, 1955, now abandoned. The present invention is concerned with polymerizable sulfides which have the Formula I:

I   $CH_2=C(R)-S-R'-O-R''$ in which R is a hydrogen atom or a methyl group, R' is a methylene, ethylidene or isopropylidene group having respectively the structures, $-CH_2-$ $$-\overset{\underset{|}{CH_3}}{C}H- \text{ and } CH_3-\overset{\underset{|}{CH_3}}{C}-CH_3$$

and R'' is an alkyl group containing one to eight carbon atoms.

It also concerns polymers of compounds of Formula I above.

The products of this invention are prepared by first reacting mercaptoethanol or mercaptopropanol of Formula II with a halogenated ether of Formula III to produce a compound of Formula IV according to the following representation in which the character X is an atom of chlorine or bromine and the characters R, R', and R'' have the significance described above:

$$HOCH_2CH(R)SH + XR'-O-R''$$
$$\text{II} \qquad \text{III}$$
$$\rightarrow HOCH_2CH(R)-S-R'-O-R'' + HX$$
$$\text{IV}$$

The product of this first reaction is then dehydrated at an elevated temperature, of the order of 200° C., in the presence of a dehydration catalyst according to the following equation:

$$HOCH_2CH(R)-S-R'-O-R''$$
$$\text{II}$$
$$\rightarrow CH_2=C(R)-S-R'-O-R'' + H_2O$$
$$\text{I}$$

The mercaptoalkanols which are employed in the preparation of the polymerizable sulfides of this invention are mercaptoethanol, $HOC_2H_4SH$, or mercaptopropanol, $HOCH_2CH(CH_3)-SH$.

The halogenated ethers which are used are readily available or are easily prepared by known methods. They have the general formula $$X-R'-O-R''$$

wherein R' is the methylene group, $-CH_2-$, the ethylidene group, $$CH_3\overset{|}{C}-H$$

or the isopropylidene group, $$CH_3-\overset{|}{C}-CH_3$$

X is an atom of chlorine or bromine, and R'' is an alkyl group containing one to eight carbon atoms.

The character R'' is typified by the following groups: methyl, ethyl, n-propyl, isopropyl, n-butyl, sec-butyl, isobutyl, tert-butyl, n-amyl, tert-amyl, hexyl, n-octyl and 2-ethylhexyl groups, as well as the isomers and homologues of thes groups.

In the preparation of the products of this invention, the mercaptoalkanol and the halogenated ether are best reacted at a temperature below 50° C. in the presence of a material which reacts with, or accepts, the liberated hydrogen halide readily. Temperatures from 0° to 50° C. have ben used; but it is preferred to operate within the range of about 0° C. to about 30° C. While it is preferred to employ an alkali metal hydroxide, notably sodium hydroxide, as the acceptor for the liberated hydrogen chloride or hydrogen bromide, other materials may be used such as lime, alkali metal carbonates and organic bases such as trimethylamine, triethylamine, pyridine, dimethylbenzylamine and quaternary ammonium hydroxides typified by trimethylbenzylammonium hydroxide. For convenience, it is suggested that the reaction be carried out in the presence of an inert solvent which does not react with the starting materials or with the products. Suitable solvents include methanol, ethanol, butanol, dioxane, benzene and water.

The intermediate compounds of Formula IV

IV   $HOCH_2CH(R)-S-R'-O-R''$ after being freed of salt and solvent by conventional means such as filtration and distillation, is next dehydrated to produce the monomers of Formula I at a temperature above about 150° C.—preferably within the temperature range of about 190° C. to about 220° C. It is recommended that the compound be heated in the presence of a catalyst such as aluminum oxide or an hydroxide of an alkali metal; the heating effects decomposition of the compound to form the unsaturated monomer of Formula I and water, which are distilled. A convenient method is to "flash dehydrate" by introducing the compound into a heated reactor at such a rate that it decomposes and the monomer and water distill out of the reactor as fast as the compound of Formula IV is added. Thereafter the unsaturated product is separated from the water and is purified by fractional distillation. Alternatively, dehydration of the compound of Formula IV may be effected by adding an alkali metal hydroxide, such as sodium or potassium hydroxide, to the compound and distilling the product of Formula I at reduced pressures, such as from about 20 to about 50 mm. Hg absolute.

All of the monomeric products of this invention can be polymerized alone. They can also be copolymerized with each other and with other polymerizable compounds containing one or more points of ethylenic unsaturation providing a $-CH=C=$ group, and especially those having a terminal $CH_2=C=$ group including both the vinyl and the vinylidene group. Consequently, a wide variety of resinous products can be obtained which range from soft, sticky materials to hard and essentially insoluble materials. They can be polymerized and copolymerized in bulk, in solution, and in aqueous suspension or emulsion. The polymeric products contain a plurality of recurring units having the configuration of Formula V:

V
$$-CH_2-\overset{|}{C}(R)-$$
$$\overset{|}{S}-R'-O-R''$$

As indicated above, the products of this invention polymerize by addition or vinyl polymerization. They also copolymerize with other monomeric materials which are likewise subject to addition or vinyl polymerization.

Such polymeric materials, particularly the copolymers of a mixture of a monomeric material of this invention and a polyvinylidene compound containing two or more vinylidene groups $CH_2=C=$, can be treated with an aqueous solution of an oxidizing agent and thus converted to products which contain recurring units of the structure of Formula VI.

VI 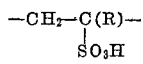

These sulfonated, resinous products have cation-exchanging properties; and the insoluble cross-linked type are the subject of my applications for Letters Patent, Serial No. 485,315, filed January 31, 1955, now abandoned, and Serial No. 571,877, filed March 16, 1956, now U. S. Patent 2,868,738.

The monomers and polymers of the invention are characterized by certain unusual properties that appear to be attributable to the —S—R'—O—R" group and to the fact that a single carbon of the radical R' is joined directly to both of the sulfur and oxygen atoms. Not only are these monethylenically unsaturated monomers capable of polymerizing with themselves and with other monoethylenically unsaturated compounds to produce linear polymers, but they impart to the linear polymers the capacity to be cross-linked by simple heating. This cross-linking by simple heating is believed to result from a reaction of the alkoxymethyl group in different polymers by a transacetalization reaction. Such a reaction can only be obtained when the linkage between the sulfur and the oxygen atoms has a single carbon atom connected directly to both of the sulfur and oxygen atoms. When this linkage contains two or more carbon atoms in a chain extending between the sulfur and oxygen atoms, cross-linking by this procedure is prevented.

An additional capability is obtained when the alkoxymethyl groups of the present invention are present in the polymers. It has been found that such groups can be oxidized not merely to a sulfone but even to a sulfonic acid group. By this procedure homopolymers or copolymers containing from 1 to 99 mole percent by weight of the monomers of the present invention can be converted to valuable polymeric substances containing units of Formula VI above. These substances, especially polymers containing from about 25 to 100 mole percent of such units, include valuable thickening agents for aqueous media, such as rubber or synthetic rubber latices, acrylate emulsion polymer systems. Also copolymers of a small amount, from 0.5 to 5 mole percent, and even up to 10 mole percent of such units, with a large proportion of other monomers, such as acrylonitrile, vinyl chloride, vinyl acetate, vinylidene chloride, and mixtures thereof provide valuable polymers for forming fibers, films, and other shaped masses having improved moisture-regain and dyeing-properties especially for basic dyes. Also cross-linked polymers of the alkoxymethyl vinyl sulfide with polyethylenically unsaturated cross-linking agents, such as divinylbenzene, can be oxidized to introduce sulfonic acid groups in order to produce valuable cation-exchange resins claimed in the above-mentioned applications 485,315 (now abandoned) and 571,877 (now U.S. Patent 2,868,738). An alkoxyethyl vinyl sulfide or other alkoxyalkyl vinyl sulfide, in which the alkyl provides two or more carbon atoms in a chain between the sulfur and oxygen atoms, is incapable of being oxidized beyond the sulfone stage without substantially complete decomposition of the polymer.

Besides being cross-linked by heating, the polymers containing the alkoxymethylsulfide groups can be cross-linked by treating with an acid followed by a mild oxidation. This appears to involve a hydrolysis to a thiol (—SH) group (by an acid) and then the joining of thiol groups on different polymer molecules to form disulfide linkages. Cross-linking in this manner is also dependent on the carbon atom of radical R' being attached directly to both the oxygen and sulfur atoms. This cross-linking does not occur when two carbons in a chain form the linkage extending between the sulfur and oxygen atoms.

These two procedures of cross-linking (either by heating or by acid-hydrolysis and mild oxidation) make the thermoplastic linear polymers of the monomers of the present invention valuable coating resins, either in organic solvent or lacquer systems or aqueous emulsion polymer systems. Thus, lacquers or aqueous dispersions of the homopolymers or preferably of copolymers containing 1 to 50 mole percent, most preferably about 2 to 10 mole percent, of the units of Formula V with comonomers, such as vinyl acetate, styrene, acrylonitrile, or esters of acrylic, methacrylic or itaconic acid, e.g. methyl, ethyl, butyl, and t-octyl acrylate or methacrylate, or with mixtures of two or more of such comonomers may be coated, by brush, spraying, or the like, on surfaces of metals, wood, glass, leather or textile fabrics, paper and other fibrous materials may be coated or impregnated with the lacquers or dispersions. Then the films thereby obtained may be cross-linked to increase the strength, abrasion-resistance, adhesion, solvent-resistance, and heat-resistance by heating during or after drying to temperatures at which the substrate material is not damaged within the range of 70° C. to 250° C. for times from 1 to 30 minutes at the higher temperature to an hour to 6 hours or longer at the lower temperature. Instead of relying on heating, the dried film may be subjected to an acid, e.g. a ¼ to 10% aqueous solution of a mineral acid like sulfuric acid and then with a mild oxidizing agent, such as air and dilute aqueous solutions of hydrogen peroxide (up to about 3% concentration).

The polymeric products which are obtained by polymerizing the monomers of this invention alone range from sticky, viscous liquids, suitable as adhesives, to hard, clear masses which are suitable for the preparation of molded objects of art and industry. The physical characteristics of the polymers depend to a large extent on the size of the groups which are represented by R, R', and R" in the general formula above. The compounds in which R is a methyl group are harder than those in which R is a hydrogen atom, all other substituents being constant. As the groups represented by R' and R" increase in size from one compound to another, the resultant polymers are found to be increasingly soft.

Monoethylenically unsaturated compounds which contain at least one vinyl or vinylidene group of the structure, $CH_2=C=$, and which are copolymerizable with the products of this invention are typified by the following: esters of acrylic, α-chloroacrylic and methacrylic acids such as methyl acrylate, ethyl acrylate, n-butyl acrylate, 2-ethylhexyl acrylate, methyl methacrylate, n-butyl methacrylate, tert-butyl methacrylate, octyl methacrylate, butyl chloroacrylates and lauryl acrylate; vinyl hydrocarbons such as styrene, α-methyl styrene, ethyl styrenes, vinyl toluene and vinyl naphthalene; vinyl chloride and vinylidene chloride; copolymers of vinyl chloride and vinyl esters of lower aliphatic acids such as vinyl acetate and vinyl propionate; allyl and methallyl esters such as allyl acetate and methallyl propionate; acrylonitrile; vinyl pyridine, and the like.

The products of this invention also copolymerize with polyethylenically unsaturated monomers, such as monomeric polyvinyl compounds, which are known to be cross-linkers leading to the formation of insoluble, three-dimensional, non-thermoplastic copolymers. Typical copolymerizable polyethylenically unsaturated compounds include divinylbenzene, trivinylbenzene, divinylnaphthalene, diallyl phthalate, ethylene glycol dimethacrylate, divinyltoluene, ethylene glycol diacrylate, divinylxylene, divinylethylbenzene, divinyl ether, divinyl sulfone, allyl ethers of polyhydric compounds such as of glycerol, pentaerythritol, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N'-ethylidenediacrylamide, 1,2-di(α-methylmethylenesulfonamido)-ethylene, and so on.

As pointed out above, the polymers and copolymers of the products of this invention are themselves capable of becoming cross-linked without the incorporation of a polyvinyl cross-linking compound. On being heated the linear polymers and copolymers gradually go over to forms which are non-thermoplastic. At the same time, they lose their solubility. This property of forming cross-linked products, which distinguishes the products of this invention from, for example, vinyl alkyl sulfides, is due to the particular grouping, —S—R'—O—R", which is present in each compound in which a single carbon of R' is directly connected to both the oxygen and sulfur atoms.

Thus it is seen that cross-linked products can be made by copolymerization of a polyvinyl compound such as divinylbenzene with the monomeric compounds of this invention, or by heating the homopolymers of the products of this invention, or by heating copolymers of a monovinyl compound such as methyl methacrylate and one of the compounds of this invention. Also, the linear homopolymers and copolymers may be cross-linked by acid hydrolysis and mild oxidation.

The compounds of Formula I can be copolymerized in all proportions with other compounds containing at least one group of the structure, $CH_2=C\stackrel{=}{=}$; and the particular ratios of comonomers chosen depends on the desired end-use of the copolymer. At present, it appears that at least 1%, on a molar basis, and preferably from about 2% to about 20%, of a product of this invention should be used in the preparation of copolymers which are to be cross-linked after application, as in coating, impregnating, and so on, inasmuch as such ratios assure the presence of a sufficient number of the cross-linking —S—R'—O—R" groups in each macromolecule of the final copolymer. In the making of coating resins, which are to be cured by heating, for example, copolymers of about 5 to 20 mole percent of methoxymethyl vinyl sulfide with the balance of one or more acrylic or methacrylic esters are quite satisfactory; the balance, for example, may comprise from 30 to 70 mole percent of butyl acrylate and 70 to 30 mole percent respectively of methyl methacrylate. On the other hand, as little as 0.5%—but preferably about 1% to about 15%—of a polyvinyl compound such as divinylbenzene can be employed for the purpose of cross-linking the polymer so that a maximum number of —S—R'—O—R" groups will be retained for conversion, for example, to sulfonic acid groups in the production of ion-exchange resins.

Polymerization and copolymerization of the products of this invention are both accelerated by the use of heat, ultraviolet light and free-radical catalysts. The following are typical of suitable catalysts: α,α'-bis-azoisobutyronitrile, dimethyl azobisisobutyrate, 2,2'-azobis-2,4-dimethylvaleronitrile, 1,1'-azodicyclohexanecarbonitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "per-salts" such as ammonium persulfate and ammonium perborate. The catalysts are used in amounts from 0.2% to 5%, and preferably from 0.5% to 2%, based on the weight of the polymerizable compounds.

The following examples are presented as embodying the preferred process for making and utilizing all of the novel products of this invention. In the examples, the parts and percentages are by weight unless specifically stated otherwise:

*Example I*

(A) Into a flask equipped with a stirrer, thermometer, reflux condenser and dropping funnel was charged a solution of 156.25 grams (2.0 moles) of mercaptoethanol, 80.0 grams (2.0 moles) of sodium hydroxide in 700 milliliters of absolute ethanol. The stirred solution was cooled to 0° C. and was thereafter maintained between 0° and 10° C. by means of an ice-bath while 155 grams (1.94 moles) of chloromethyl methyl ether was added dropwise over a period of an hour. The reaction was allowed to continue for one-half hour after which the ice-bath was removed and the reaction mixture was held overnight at ambient temperature. The sodium chloride was filtered off and the filtrate was stripped of alcohol at atmospheric pressure. The residue was fractionally distilled and the fraction boiling at 57° to 58° C./1 mm. was retained. The product which was obtained in a 52% yield had an index of refraction ($n_D^{20}$) of 1.4873 and a density ($d_4^{20}$) of 1.1109. Its composition, corresponding to the formula $$HOC_2H_4—S—CH_2—O—CH_3$$

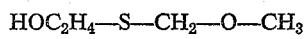

was confirmed by analysis.

(B) Thirty grams of KOH pellets (85%) were placed in a stainless steel reactor equipped with stirrer, condenser, thermometer and dropping funnel. The reactor was heated on a metal bath and the KOH was fused at 205° C. To the agitated melt was added dropwise over a period of two hours 83.4 grams of the compound, $HOC_2H_4SCH_2OCH_3$, prepared above. The aqueous phase of the distillate which was collected continuously over the two-hour period was salted out with potassium carbonate and separated. The organic phase was dried over anhydrous potassium carbonate and was then fractionally distilled. The fraction boiling at 78° to 80° C./190 mm. represented a yield of 66.2 mole percent. It had an index of refraction ($n_D^{20}$) of 1.4807 and a density ($d_4^{20}$) of 0.9955. Its composition, $$CH_2=CH—S—CH_2—O—CH_3$$

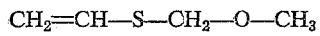

was confirmed by analysis.

*Example II*

(A) The procedure of part A of Example I was followed in the preparation of 2(2-ethylhexoxymethylmercapto)ethanol having the formula $$HOC_2H_4–S–CH_2–O–CH_2CH(C_2H_5)CH_2CH_2CH_2CH_3$$

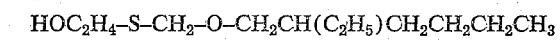

Thus to a solution of 234.3 grams (3.0 moles) of mercaptoethanol, and 124 grams (3.0 moles) of sodium hydroxide (97%) in 1050 ml. of absolute alcohol was added dropwise 520 grams (2.91 moles) of 2-ethylhexyl chloromethyl ether. The product was obtained in the form of a 62% azeotropic mixture with di(2-ethylhexyl)formal. It boiled at 104° C./0.6 mm.

(B) Sixty grams of potassium hydroxide (85%) and 60 grams of the azeotropic mixture produced in part A above were mixed in a stainless steel reactor equipped with stirrer, reflux condenser and thermometer. The stirred mixture was heated to 210° C. and was held at 210° to 220° C. for eight hours. The reaction mixture was then cooled to room temperature and the aqueous and organic phases were separated. The organic phase was fractionally distilled and a 37% yield was obtained of a compound, the analysis of which confirmed the formula $$CH_2=CHSCH_2OCH_2CH(C_2H_5)CH_2CH_2CH_2CH_3$$

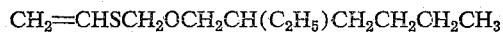

The product had an index of refraction ($n_D^{20}$) of 1.4698 and a density ($d_4^{20}$) of 0.8986. It boiled at 93° C./4 mm. Hg.

*Example III*

To the sulfide, $CH_2=CHSCH_2OCH_3$, prepared by the process of Example I was added 1%, on a weight basis, of dimethyl azoisobutyrate. The solution was poured into a mold and was held at 60° C. for 24 hours. During this time the material polymerized to a transparent, essentially colorless, soft polymer. This polymer was thermoplastic and showed cold flow and was completely soluble in ethylene dichloride. A portion of the product was heated in an oven at 140° C. for five hours during which time it lost approximately 1% of its weight, became insoluble in ethylene dichloride and was no longer subject to cold flow.

To a mixture of 95 parts of methyl methacrylate and 5 parts of vinyl methoxymethyl sulfide, the latter having been prepared by the process of Example I, was added 1%, on a weight basis, of dimethyl azoisobutyrate. The solution was poured into a mold and was held at 60° C. for 24 hours. The rigid, transparent copolymer, thus obtained, was thermoplastic and was completely soluble in ethylene dichloride. When the copolymer was heated in an oven at 180° C. for 4 hours it lost 2.3% of its weight and became insoluble in ethylene dichloride. There was, however, no significant change in its appearance.

A similar mixture containing 10 parts of vinyl methoxymethyl sulfide and 90 parts of methyl methacrylate was catalyzed and polymerized in the same way. The resultant copolymer was transparent and solid but was soluble in ethylene dichloride. The copolymer became insoluble in ethylene dichloride on being heated at 150° C. for 4 hours, during which time it lost 1.5% of its weight.

A mixture of equal volumes of ethyl acrylate and vinyl-2-ethylhexoxymethyl sulfide, containing 2% by weight of dimethyl azobisisobutyrate was heated in bulk in a mold at 65° to 70° C. for 20 hours under a blanket of nitrogen. The viscous mass was dissolved in ethylene dichloride and this solution was poured into three times its volume of methanol. The precipitate which formed was removed and dried and was fused into a clear, slightly tacky mass. A 47% yield was thus obtained of the copolymer.

In exactly the same way, a copolymer was prepared from equal volumes of vinyl methoxymethyl sulfide and n-butyl acrylate. A 58% yield was obtained of the final fused product which was colorless, clear, soft and tacky. It had very strong adhesion to paper, leather and glass.

Another good coating resin is obtained by copolymerizing, in the same way, a mixture of 7 parts of methoxymethyl vinyl sulfide, 40 parts of methyl methacrylate and 60 parts of butyl acrylate.

In a similar way, copolymers, prepared from methyl methacrylate, ethyl methacrylate and styrene, and containing 5% to 20%, on a molar basis, of vinyl methoxymethyl sulfide or vinyl ethoxymethyl sulfide were thermoplastic and soluble in ethylene dichloride as prepared; and became insoluble in the same solvent when they were heated for a matter of two to four hours at temperatures from 150° C. to 180° C. In every case, there was a small loss in weight of the copolymer but the product remained transparent, free of bubbles, and essentially unchanged in appearance.

*Example IV*

In this instance a cross-linked copolymer of vinyl methoxymethyl sulfide and divinylbenzene was prepared in the form of small spheroids by suspension of polymerization. Thus, a mixture of 17.2 grams of vinyl methoxymethyl sulfide, 2.84 grams of divinylbenzene (technical grade) and 0.4 gram of dimethyl azobisisobutyrate was suspended in an aqueous phase containing 27.5 grams of water, 11.4 grams of sodium chloride and 1.8 grams of a 3% aqueous dispersion of magnesium silicate. The mixture, in a three-necked flask equipped with stirrer, thermometer, reflux condenser and gas-inlet tube, was stirred and heated to 80° C. under a blanket of nitrogen. Stirring and heating at 80° to 85° was continued for 22 hours, after which the beads of resin were filtered off and were washed with ethanol. The beads were next thoroughly extracted with ethylene dichloride and were finally dried.

The insoluble, cross-linked, resinous beads were then reacted with a 5% aqueous solution of hydrogen peroxide which also contained 4% sulfuric acid. This reaction was conducted at 40° to 45° C. for five hours; and it gave rise to a sulfonated resin, still in bead form, which had a cation-exchange capacity of between five and six milliequivalents per gram (dry basis).

It is to be understood that changes and variations may be made without departing from the spirit and scope of the invention as defined in the appended claims.

I claim:

1. Polymerizable organic sulfides having the general formula

I 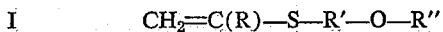

in which R is a member of the class consisting of a hydrogen atom and a methyl group, R' is a member of the class consisting of methylene, ethylidene and isopropylidene groups, and R" is an alkyl group containing one to eight carbon atoms.

2. The polymerizable organic sulfide having the formula

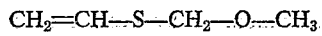

3. The polymerizable organic sulfide having the formula

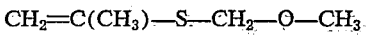

4. The polymerizable organic sulfide having the formula

5. The polymerizable organic sulfide having the formula

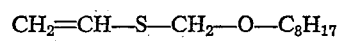

6. The polymerizable organic sulfide having the formula

7. A polymer of an organic sulfide which has the general formula $$CH_2=C(R)-S-R'-O-R''$$

in which R is a member of the class consisting of a hydrogen atom and a methyl group, R' is a member of the class consisting of methylene, ethylidene and isopropylidene groups, and R" is an alkyl group containing one to eight carbon atoms.

8. A copolymer containing (a) at least 1%, on a molar basis, of the copolymerized sulfide having the formula Ia $\quad CH_2=CH-S-CH_2-O-CH_3$ and (b) at most 99% of copolymerized methyl methacrylate.

9. A copolymer containing (a) at least 1%, on a molar basis, of the copolymerized sulfide having the formula Ib $\quad CH_2=C(CH_3)-S-CH_2-O-CH_3$ and (b) at most 99% of copolymerized methyl methacrylate.

10. A copolymer of (a) at least 1% on a molar basis, of methoxymethyl vinyl sulfide and (b) at most 99% of butyl acrylate.

11. A copolymer containing (a) at least 1%, on a molar basis, of methoxymethyl vinyl sulfide and (b) at most 99% of styrene.

12. A copolymer of (a) 85% to 99%, on a molar basis, vinyl methoxymethyl sulfide and (b) 1% to 15%, on a molar basis, of divinylbenzene.

13. A composition comprising a copolymer of about 5 to 20 mole percent of methoxymethyl vinyl sulfide and 95 to 80 mole percent of at least one ester of an acid selected from the group consisting of acrylic, α-chloroacrylic and methacrylic acids including methyl acrylate, ethyl acrylate, n-butyl acrylate, 2-ethylhexyl acrylate, methyl methacrylate, n-butyl methacrylate, tert-butyl methacrylate, octyl methacrylate, butyl chloroacrylates, and lauryl acrylate.

14. A composition comprising a copolymer of about 5 to 20 mole percent of methoxymethyl vinyl sulfide and 95 to 80 mole percent of a mixture comprising 30 to 70 mole percent of n-butyl acrylate and 70 to 30 mole percent respectively of methyl methacrylate.

15. A copolymer containing (a) a copolymerized monoethylenically unsaturated compound, and (b) at least 1 percent, on a molar basis, of a copolymerized organic sulfide having the general formula $$CH_2=C(R)-S-R'-O-R''$$

in which R is a member of the class consisting of a hydrogen atom and a methyl group, R' is a member of the class consisting of methylene, ethylidene and isopropylidene groups, and R'' is an alkyl group containing one to eight carbon atoms.

References Cited in the file of this patent

UNITED STATES PATENTS

| | | |
|---|---|---|
| 2,522,590 | Vaughan | Sept. 19, 1950 |
| 2,563,383 | Vaughan | Aug. 7, 1951 |
| 2,664,414 | Morris | Dec. 29, 1953 |

UNITED STATES PATENT OFFICE

CERTIFICATE OF CORRECTION

Patent No. 2,906,741                                    September 29, 1959

Jesse C. H. Hwa

It is hereby certified that error appears in the printed specification of the above numbered patent requiring correction and that the said Letters Patent should read as corrected below.

Column 8, line 32, claim 4, the formula should appear as shown below instead of as in the patent:

Signed and sealed this 8th day of March 1960.

(SEAL)
Attest:

KARL H. AXLINE                                    ROBERT C. WATSON
Attesting Officer                                  Commissioner of Patents